United States Patent

Sardinas

[15] 3,658,652
[45] Apr. 25, 1972

[54] COPPER IONS IN CARBOMYCIN A FERMENTATION

[72] Inventor: Joseph L. Sardinas, Gales Ferry, Conn.
[73] Assignee: Chas. Pfizer & Co., Inc., New York, N.Y.
[22] Filed: Mar. 6, 1969
[21] Appl. No.: 805,018

[52] U.S. Cl. ................................................. 195/80, 195/114
[51] Int. Cl. .......................................................... C12d 9/00
[58] Field of Search .................................... 195/80, 114, 117

[56] References Cited

UNITED STATES PATENTS 3,483,088  12/1969  Seeley .................................... 195/114
2,796,379  6/1957  Tanner et al. ......................... 195/80 X Primary Examiner—Joseph M. Golian
Attorney—Connolly and Hutz

[57] ABSTRACT

Addition of copper ions to carboymycin A-producing fermentation media gives rise to an increased yield of the antibiotic.

4 Claims, No Drawings

COPPER IONS IN CARBOMYCIN A FERMENTATION

BACKGROUND OF THE INVENTION

This invention relates to the production of the antibiotic called carbomycin A, and, in particular to the use of copper ions in its production by fermentation.

Carbomycin A is an antibiotic with important antibacterial properties and wide clinical application in the treatment of bacterial infections. The use of an antibiotic, particularly on a large scale, requires that it can be cheaply produced in large quantities.

In general terms, the media used in microbial fermentations include a source of nitrogen, a source of carbon, and nutrient salts. It is known that animals and microorganisms require certain "trace elements" as growth factors, i.e., materials which are necessary for growth and in the absence of which growth is inhibited or impossible. Trace elements are those elements, usually metals, which, although their physiological role is oftentimes obscure, are essential for the growth of animals and microorganisms. These elements are usually present in minute or trace amounts in the microorganism and in its environment. Examples of some of these trace elements, all or some of which may be required as a necessary growth factor for a particular microorganism, are: cobalt, calcium, boron, zinc, manganese, sodium, potassium, and iron.

In the case of microbial fermentations, trace elements play an important role not only in cellular production but additionally the products of metabolism arising out of the growth of the microorganism. The production of antibiotics, and in this instance, carbomycin A, is dependent on the special interplay of microbial growth and metabolic processes.

In the culture of antibiotic-producing microorganisms, the growth medium usually contains in varying amounts those trace elements necessary for growth and antibiotic production. However, the amounts and the availability of the trace elements in the natural and complex substrate materials varies with the particular source and, as a result, reproducible and satisfactory fermentation results are often difficult to obtain. It is therefore sometimes necessary to add additional amounts of one or more trace elements.

The locus of action of copper in the cell is poorly understood. Copper appears to be part of large protein molecules having a respiratory function. The importance of copper as part of the trace element complex is well known to those skilled in the fermentation art. However, the marked stimulatory effect (20–30 percent) of copper ions on carbomycin A fermentation yields, beyond that obtainable with other trace elements, alone or in combination, is a surprising fermentation phenomenon.

SUMMARY OF THE INVENTION

In general, this invention embodies a process for increasing the carbomycin A fermentation yields by the addition of copper ions to the fermentation media.

DETAILED DESCRIPTION OF THE INVENTION

A preferred process for the production of carbomycin A (U.S. Pat. No. 2,796,379 to F. W. Tanner, Jr., et al., June 18, 1957) involves the cultivation of *Streptomyces nutrient medium* ATTC-13449, preferably in an aqueous nutrient at a temperature of about 24°–30° C., and under submerged conditions with agitation and aeration. Nutrient media which are useful for this process include a carbohydrate such as sugars, starch, glycerol, and corn starch; a source of organic nitrogen such as that contained in casein, soybean meal, peanut meal, wheat gluten, cotton seed meal, lactalbumin, tryptone and enzymatic digest of casein. The use of enzymatic digest of casein as a nitrogen source is preferred. Additional growth substances are provided by the addition of such substances as distillers' solubles, yeast extract, molasses, or fermentation residues, as well as mineral salts such as sodium chloride, potassium phosphate, sodium nitrate, and magnesium sulfate. A soluble, non-growth inhibiting nonionic (poly) oxyethylene glycol ether surface-active agent, in an amount to provide a concentration of about 0.2–4 percent, is included in the fermentation; anti-foaming agents, such as vegetable oils, may be added to the fermentation medium. The pH of the fermentation tends to remain rather constant, but, if variations are encountered, a buffering agent such as calcium carbonate may also be added to the medium.

An embodiment of this invention is the addition of a copper salt at such a concentration that the final copper ion level is from about 40 to 65 ppm, and preferably from about 50 to 55 ppm.

The copper ions are provided by copper salts such as cupric sulfate, cupric chloride, cupric acetate, cupric nitrate, cupric carbonate, cupric bromide, cuprous bromide, cuprous chloride, cuprous iodide and preferably, cupric sulfate. The copper salt used is generally best added at the time of medium make-up. However, it may be added as a sterile solution or suspension up to 24 hours after inoculation of the medium.

Inoculum for the preparation of antibiotic carbomycin A by the growth of a strain of *S. halstedii* may be obtained by employing growth from slants of such media as Emerson's agar or beef lactose. The growth may be used to inoculate either shaken flasks or inoculum tanks for submerged growth, or, alternatively, the inoculum tanks may be seeded from the shaken flasks. The growth of the microorganism usually reaches its maximum in about 2 to 3 days. However, variations in the equipment used, the rate of aeration, rate of stirring, etc., may affect the speed with which the maximum activity is reached. In general, from about 24 hours to 4 days is the desirable period for producing the antibiotic. Aeration of the medium in tanks for submerged growth is maintained at the rate of about one-half to two volumes of free air per volume of broth per minute. Agitation may be maintained by suitable types of agitators generally familiar to those in the fermentation industry. Aseptic conditions, of course, must be maintained throughout the preparation and transfer of the inoculum and the growth period of the microorganism.

Recovery of the antibiotic is accomplished by means generally familiar to those skilled in the art, such as extraction, precipitation and the use of strong cation exchange resins.

The present invention embraces not only the use of the herein described organism but also of mutants thereof produced by subjecting the organism to such measures as X-radiation, ultraviolet radiation, nitrogen mustard and the like.

The following examples are merely illustrative and are not intended to limit the invention, the scope of which is defined by the appended claims.

EXAMPLE I

An inoculum is prepared, using a growth medium having the following composition:

|  | Grams/liter |
|---|---|
| Cerelose | 15.0 |
| Soy flour | 30.0 |
| MgSO$_4$·7H$_2$O | 1.0 |
| Calcium carbonate | 10.0 |

The medium is adjusted to pH 6.8 with potassium hydroxide, and then sterilized and cooled. Spores of a 7-day old Emerson agar slant of *S. halstedii* ATCC-13449 are transferred under aseptic conditions to 20 ml. of water, and a homogeneous suspension of spores is obtained by shaking. Six ml. of this suspension is transferred into 750 ml. of the above medium in a 2.8 liter Fernbach flask, and shaken for 48 hours at 30° C.

A nutrient medium is prepared having the following composition:

|  | Grams/liter |
|---|---|
| Enzose E-081 (sugar concentrate, Corn Products, Inc. | 25.0 ml. |
| Beet molasses | 22.5 |
| Wheat starch | 5.0 |
| Cerelose | 15.0 |

| | |
|---|---|
| Casein Digest(5%) | 400 ml. |
| $MnSO_4 \cdot H_2O$ | 1.5 |
| $MgSO_4 \cdot 7H_2O$ | 1.25 |
| $CuSO_4 \cdot 5H_2O$ | 0.20 ($Cu^{++}$, 50 ppm) |

The pH of the medium is adjusted to 7.0 with potassium hydroxide. 0.5 ml. Antifoam A (Dow Chemical Company) and 10 ml. Tergitol NP–35 (Union Carbide) are added per liter of medium, and the mixture is sterilized.

A 10 percent aliquot of the inoculum is transferred under aseptic conditions into the above nutrient medium. After agitation and aeration for 2 days, the potency of the broth is found to be about 2073 mcg of carbomycin A per ml. The potency of the control medium (without copper) averages about 1715 mcg/ml.

EXAMPLE II

The process of Example I is repeated using 0.25 grams of $CuSO_4 \cdot 5H_2O$ per liter ($Cu^{++}$, 55 ppm) in place of 0.20 grams per liter ($Cu^{++}$, 50 ppm), with comparable results.

EXAMPLE III

The process of Example I is repeated with the cupric sulfate replaced by one of the copper salts indicated below, with comparable results.
  cupric chloride
  cupric acetate
  cupric nitrate
  cupric carbonate
  cupric bromide
  cuprous bromide
  cuprous chloride
  cuprous iodide

EXAMPLE IV

The inoculum of Example I is used to inoculate a nutrient medium having the following compositions:

| | Grams/liter |
|---|---|
| Cerelose | 25.0 |
| Beet molasses | 15.0 |
| Wheat starch | 5.0 |
| Casein digest (5%) | 400 ml |
| $MnSO_4 \cdot H_2O$ | 1.5 |
| $MgSO_4 \cdot 7H_2O$ | 1.25 |
| $CuSO_4 \cdot 5H_2O$ | 0.20 ($Cu^{++}$, 50 ppm) |

The pH of the medium is adjusted to 7.0 with potassium hydroxide. One-half ml. Antifoam A (Dow Chemical Company) and 10 ml. Tergitol NP–35 (Union Carbide) are added per liter of medium, and the mixture is sterilized.

A 10 percent aliquot of inoculum is transferred under aseptic conditions into the above nutrient medium. After agitation and aeration for 2 days, the broth potency is substantially greater than that of a control fermentation without copper.

EXAMPLE V

The process of Example IV is repeated using 0.25 grams of $CuSO_4 \cdot 5H_2O$ per liter ($Cu^{++}$, 55 ppm) in place of 0.20 grams per liter ($Cu^{++}$, 50 ppm), with comparable results.

EXAMPLE VI

The process of Example IV is repeated using 0.16 grams of $CuSO_4 \cdot 5H_2O$ per liter ($Cu^{++}$, 40 ppm) in place of 0.20 grams per liter ($Cu^{++}$, 50 ppm), with comparable results.

EXAMPLE VII

The process of Example IV is repeated using 0.26 grams of $CuSO_4 \cdot 5H_2O$ per liter ($Cu^{++}$, 65 ppm) in place of 0.20 grams per liter ($Cu^{++}$, 50 ppm), with comparable results.

What is claimed is:

1. In the process for the production of carbomycin A by fermentation of *Streptomyces halstedii*, the improvement which comprises conducting the fermentation in the presence of a copper salt in an amount to provide a concentration of copper ions of about 40–65 ppm.

2. The process of claim 1 wherein said copper salt is cupric sulfate.

3. The process of claim 1 wherein said copper salt is selected from the group consisting of cupric chloride, cupric acetate, cupric nitrate, cupric carbonate, cupric bromide, cuprous bromide, cuprous chloride, cuprous iodide.

4. In the process for the production of carbomycin A by the cultivation of *Streptomyces halstedii* ATCC–13449 in an aqueous, nutrient medium under submerged, aerobic conditions, the improvement which comprises conducting the fermentation in the presence of a copper salt in an amount to provide a concentration of copper ions of about 50–55 ppm.

* * * * *